(No Model.)

H. L. McCANN.
NUT LOCK.

No. 574,256. Patented Dec. 29, 1896.

Witnesses:
Wm. F. Doyle.
A. B. Smith.

Inventor.
Howard L. McCann.
By. H. B. Willson,
Attorney.

UNITED STATES PATENT OFFICE.

HOWARD L. McCANN, OF COATESVILLE, PENNSYLVANIA, ASSIGNOR OF ONE-HALF TO WALTER P. JACKSON, OF SAME PLACE.

NUT-LOCK.

SPECIFICATION forming part of Letters Patent No. 574,256, dated December 29, 1896.

Application filed June 22, 1896. Serial No. 596,487. (No model.)

*To all whom it may concern:*

Be it known that I, HOWARD L. MCCANN, a citizen of the United States, residing at Coatesville, in the county of Chester and State of Pennsylvania, have invented certain new and useful Improvements in Nut-Locks; and I do declare the following to be a full, clear, and exact description of the invention, such as will enable others skilled in the art to which it appertains to make and use the same.

My invention has relation to improvements in nut-locks for bolts for railroad-rails or any other purpose; and the object is to provide a simple, efficient, and durable device of this class.

To this end the novelty consists in the construction, combination, and arrangement of the same, as will be hereinafter more fully described, and particularly pointed out in the claim.

In the accompanying drawings the same figures of reference indicate the same parts of the invention.

Figure 1:
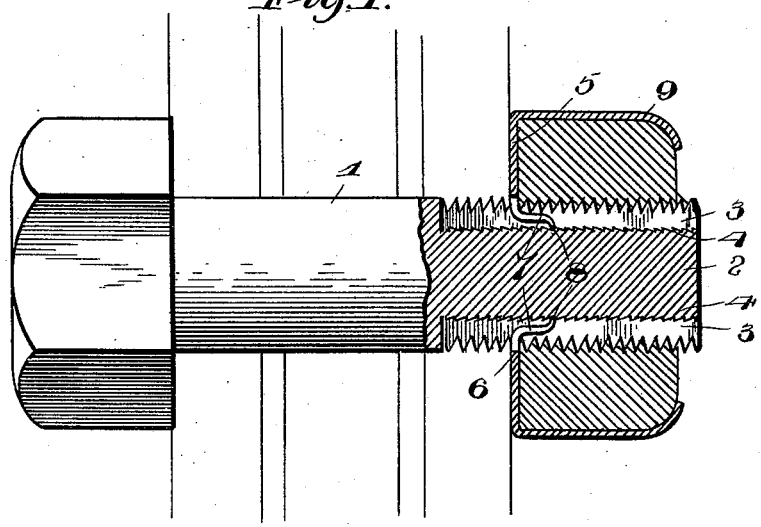
Figure 2:
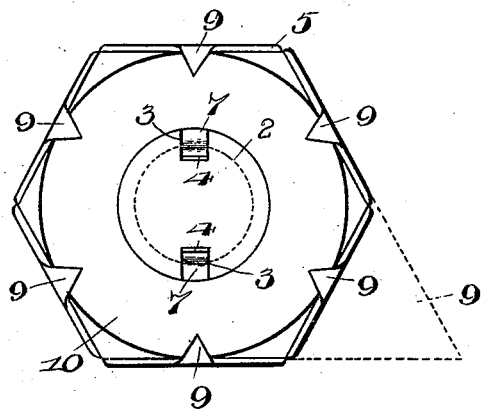

Figure 1 is a longitudinal section of my improved nut-lock, and Fig. 2 is a front view of the nut secured upon the end of the bolt.

1 represents the ordinary bolt, the threaded portion 2 of which is formed with two oppositely-disposed longitudinal radial slots 3, the bottom of which is provided with ratchet-shaped teeth 4.

5 is a spring sheet-metal washer having a central opening 6 for the screw-threaded portion of the bolt, and it is provided with oppositely-disposed and inwardly-projecting spring-arms 7, which fit into the slots in the bolt, and their beveled ends 8 engage the teeth 4 and prevent the washer from being withdrawn. The periphery of the washer is formed with a series of radially-projecting spurs 9, as shown.

10 is an ordinary nut.

In operation the washer is first placed on the bolt, the arms 7 sliding freely in the slots 3. The washer is pressed up against the fish-plate, and the beveled ends 8 of the arms engage the teeth in the slot to hold said washer securely in place on the bolt. The nut is then screwed home, and the spurs 9 are then bent down over the sides and chamfer of the nut, and rigidly hold it in place.

Having thus fully described my invention, what I claim as new and useful, and desire to secure by Letters Patent of the United States, is—

A nut-lock comprising a bolt 1, the threaded portion 2 of which is provided with two oppositely-disposed longitudinal radial slots 3 3, the bottom of which is formed with ratchet-shaped teeth 4, in combination with the spring-metal washer 5 having the central opening 6, provided with the two oppositely-disposed inwardly-projecting spring-arms 7, having beveled ends 8, and radially-projecting spurs 9, and the nut 10, substantially as shown and described.

In testimony whereof I hereunto affix my signature in presence of two witnesses.

HOWARD L. McCANN.

Witnesses:
WILLIAM H. SHANNON,
JAMES F. KELLY.